US012655058B2

(12) United States Patent
Jolly

(10) Patent No.: US 12,655,058 B2
(45) Date of Patent: Jun. 16, 2026

(54) COLD-END COATING FOR A GLASS CONTAINER

(71) Applicant: Owens-Brockway Glass Container Inc., Perrysburg, OH (US)

(72) Inventor: Frederic Jolly, Auberives sur Vareze (FR)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 18/585,627

(22) Filed: Feb. 23, 2024

(65) Prior Publication Data

US 2025/0270134 A1     Aug. 28, 2025

(51) Int. Cl.
*C03C 17/00*          (2006.01)
*B65D 1/02*           (2006.01)
                      (Continued)

(52) U.S. Cl.
CPC .......... *C03C 17/007* (2013.01); *B65D 1/0215* (2013.01); *B65D 23/0821* (2013.01);
                      (Continued)

(58) Field of Classification Search
CPC ... C03C 17/007; C03C 17/005; C03C 17/009; C03C 2217/445; C03C 2217/475; C03C 2217/78; C03C 2218/112; C03C 2218/31; B65D 1/0215; B65D 23/0821; C03B 25/04; C08F 2/00; C08L 23/0869; C09D 123/0869
See application file for complete search history.

(56) References Cited

U.S. PATENT DOCUMENTS 3,323,889 A * 6/1967 Carl .......................... C08F 8/20
                                                   65/60.2
3,407,085 A * 10/1968 Kitaj ....................... C03C 17/42
                                                   428/425.9

(Continued)

FOREIGN PATENT DOCUMENTS

CN          104402242 A     3/2015
CN          111925697 B     8/2021

OTHER PUBLICATIONS

PCT International Search Report and Written Opinion, Int. Application No. PCT/US2025/015504, Int. Filing Date: Feb. 12, 2025, Mailing Date: May 30, 2025.

*Primary Examiner* — Kareen K Thomas

(57)          ABSTRACT

A glass container is disclosed that includes a glass substrate and a cold-end coating applied over, and preferably in direct contact with, an exterior surface of the glass substrate. The cold-end coating includes encapsulated graphene in which graphene particles are surrounded by and distributed within a polymer matrix material. The graphene may include multilayer graphene and the polymer matrix material may include ethylene acrylic acid copolymer, polyethylene oxide, or both ethylene acrylic acid copolymer and polyethylene oxide. A method of applying a cold-end coating during manufacture of a glass container is also disclosed in which a coating composition is applied over an exterior surface of a glass substrate having a container shape. The coating composition is a heterogeneous solution that includes one or more emulsified organic polymers and suspended graphene.

13 Claims, 3 Drawing Sheets

(51) Int. Cl.
      B65D 23/08          (2006.01)
      C03B 25/04          (2006.01)
(52) U.S. Cl.
      CPC ............ C03B 25/04 (2013.01); C03C 17/005
            (2013.01); C03C 17/009 (2013.01); *C03C*
                  *2217/445* (2013.01); *C03C 2217/475*
            (2013.01); *C03C 2217/78* (2013.01); *C03C*
            *2218/112* (2013.01); *C03C 2218/31* (2013.01)

(56)              References Cited

U.S. PATENT DOCUMENTS 3,598,632   A   *   8/1971   Long ........................ C03C 17/42
                                                                  427/427
      4,225,049   A   *   9/1980   Inoue .................... C03C 17/328
                                                                  426/106
      5,584,903   A   *  12/1996   Guthrie ................... C23C 16/04
                                                                  65/60.1

8,940,396   B1   *   1/2015   Sharma ................ B05D 3/0254
                                                                  427/249.1
      9,970,101   B2       5/2018   Liu et al.
     10,683,435   B2       6/2020   Mongrain et al.
     11,401,425   B2       8/2022   Tang et al.
   2011/0123776   A1   *   5/2011   Shin ..................... C01B 32/182
                                                                  428/688
   2013/0143048   A1       6/2013   Kim et al.
   2014/0036369   A1   *   2/2014   Ushinsky .............. B82Y 10/00
                                                                  977/890
   2015/0129809   A1   *   5/2015   Gauthy ................. C08K 3/042
                                                                  252/511
   2016/0038885   A1   *   2/2016   Hogen-Esch .......... B01D 71/76
                                                                  210/500.33
   2016/0168391   A1   *   6/2016   Costa ..................... C09D 7/61
                                                                  428/408
   2017/0166477   A1       6/2017   Smallwood et al.
   2017/0166735   A1       6/2017   Smallwood et al.
   2023/0391506   A1   *  12/2023   Henry .................. C03C 17/256

* cited by examiner

Cold-End Coating Only

COLD-END COATING FOR A GLASS CONTAINER

TECHNICAL FIELD

This patent application discloses innovations related to glass containers and, more particularly, to coatings for glass containers.

BACKGROUND

In the manufacture of a glass container, two coatings have traditionally been applied over the exterior surface of the glass substrate of the container. The first coating, referred to as a "hot-end coating," is applied after the glass substrate is formed in a container forming machine but prior to annealing. The hot-end coating is typically a metal oxide layer, such as tin oxide or titanium oxide, which is deposited directly onto the exterior surface of the still hot glass container substrate by chemical vapor deposition. The second coating, referred to as a "cold-end coating," is applied over the hot-end coating after the glass container substrate has been annealed and cooled down to some extent. The cold-end coating typically contains a polyethylene wax and/or a complex of fatty acids and is spray-applied. Together, the hot-end coating and the cold-end coating provide the glass container with several beneficial qualities including scratch-resistance, improved glass strength, and a lubricious contact barrier, among other potential benefits. However, applying the hot-end metal oxide coating to the glass container substrate through the standard CVD approach is a complex process in which vaporized metal precursors, e.g., metal halides, are decomposed by heat to deposit the metal oxide onto the glass surface while also producing volatilized byproducts that need to be collected and managed.

SUMMARY OF THE DISCLOSURE

In accordance with one aspect of the disclosure, a glass container includes a glass substrate having a container shape and a cold-end coating applied over an exterior surface of the glass substrate. The cold-end coating includes encapsulated graphene in which graphene particles are surrounded by and distributed within a polymer matrix material. In accordance with another aspect of the disclosure, a glass container includes a glass substrate and a cold-end coating. The glass substrate has a container shape and includes an exterior surface. The cold-end coating is applied directly onto the exterior surface of the glass substrate and further defines at least a portion of an outer surface of the glass container. The cold-end coating includes particles of multi-layer graphene encapsulated within an organic polymer matrix material. Additionally, the cold-end coating is free of inorganic, non-carbonaceous materials.

In accordance with yet another aspect of the disclosure, a method of applying a cold-end coating during manufacture of a glass container includes several steps. One step of the method involves providing a coating composition. The coating composition is a heterogeneous solution that includes a liquid phase and a dispersed phase. The liquid phase includes water and the dispersed phase includes one or more emulsified organic polymers dispersed in the liquid phase and graphene particles suspended in the liquid phase. Another step of the method involves applying the coating composition over an exterior surface of a glass substrate having a container shape with at least a portion of the liquid phase evaporating out of the solution to deposit a cold-end coating over the exterior surface of the glass substrate. The cold-end coating includes encapsulated graphene in which the graphene particles are surrounded by and distributed within a polymer matrix material formed from the one or more emulsified organic polymers.

In accordance with still another aspect of the disclosure, a method of applying a cold-end coating during manufacture of a glass container includes several steps. One step of the method involves forming a glass substrate having a container shape. Another step of the method involves annealing the glass substrate. And yet another step of the method involves applying a coating composition directly onto an exterior surface of the glass substrate after annealing of the glass substrate. The coating composition is a heterogeneous solution that comprises water, particles of multilayer graphene suspended in the solution, and one or more emulsified organic polymers dispersed in the solution. The applied coating composition deposits a cold-end coating directly onto the exterior surface of the glass substrate.

DETAILED DESCRIPTION

A glass container that includes a graphene-containing cold-end coating is described below along with a coating composition and a process for coating a glass container with the cold-end coating using the coating composition. The applied cold-end coating can function without a traditional hot-end coating underneath, which in turn can eliminate the complexity and expense associated with applying a traditional hot-end coating, while still providing the glass container with a scuff-resistant lubricious exterior coating. A hot-end coating may of course still be applied to the glass container between the container and the cold-end coating, if desired, since the disclosed cold-end coating may address other problems and/or provide other advantages beyond simply eliminating the need for a hot-end coating.

Figures 1, 2:
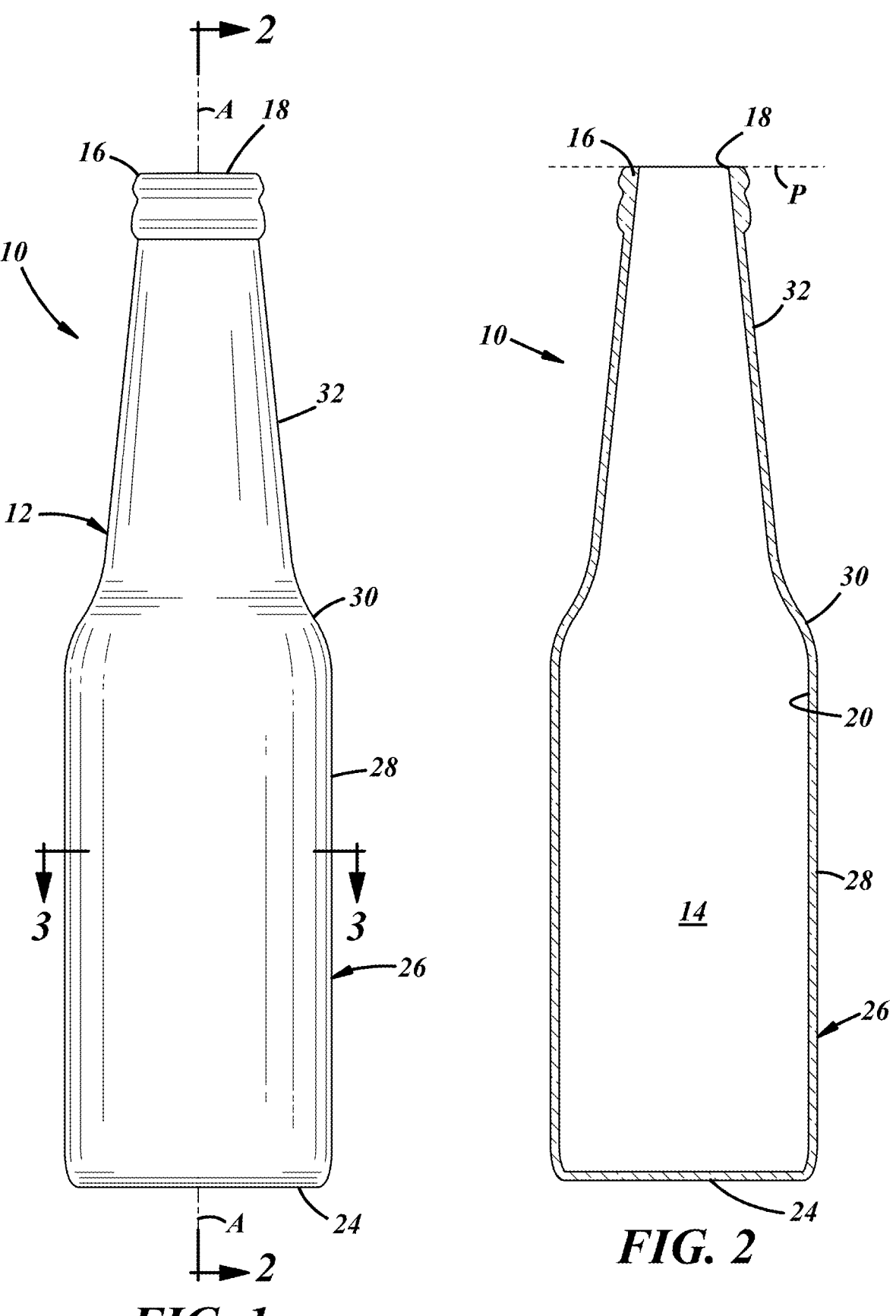
FIG. 1 is a side elevation view of an illustrative glass container.
FIG. 2 is a cross-sectional view of the glass container shown in FIG. 1 taken along section lines 2-2.
Figure 3:
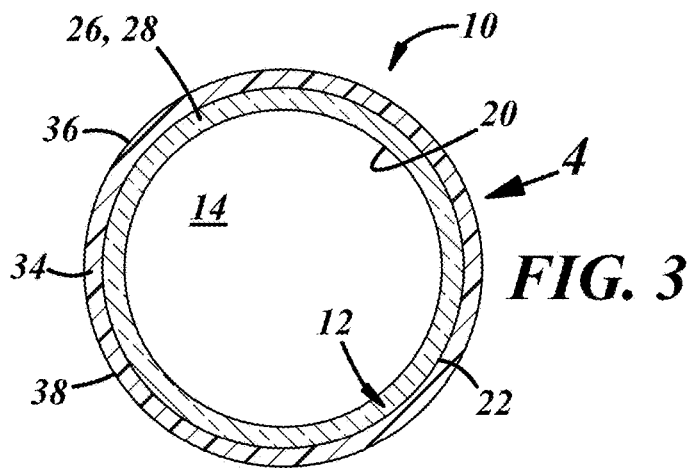
FIG. 3 is a cross-sectional view of the glass container shown in FIGS. 1 and 2 taken along section lines 3-3.

FIGS. 1-3 depict a representative glass container 10 that includes a glass substrate 12 according to various embodiments of the disclosure. The glass substrate 12 has a container shape in that the substrate 12 encloses an internal containment space 14 and provides a mouth 16 that defines an opening 18 to the internal containment space 14. The glass substrate 12 includes an interior surface 20 that delineates the internal containment space 14 below an entrance plane P of the opening 18 of the mouth 16 and, additionally, includes an exterior surface 22 outside of the entrance plane P that constitutes the entire surface of the glass substrate 12 external to the internal containment space 14. The glass from which the glass substrate 12 is composed is preferably soda-lime-silica glass. Based on the total weight of the glass, soda-lime-silica glass comprises 60 wt % to 80 wt % $SiO_2$, 8 wt % to 18 wt % $Na_2O$, and 5 wt % to 15 wt % CaO, or more narrowly from 70 wt % to 75 wt % $SiO_2$, 11 wt % to 16 wt % $Na_2O$, and 8 wt % to 14 wt % CaO, and may further include additional oxide and non-oxide constituents including, most commonly, up to 3 wt % of $Al_2O_3$.

The glass container 12 may assume any of a wide variety of configurations including bottles and jars of differing sizes and shapes. The glass substrate 12 shown here in FIG. 1 includes a closed base 24 and a circumferential wall 26. The circumferential wall 26 extends axially along a central longitudinal axis A of the container 10 from a periphery of the closed base 24 to the mouth 16 of the container 10 while also circumscribing the central longitudinal axis A. The circumferential wall 26 may include a body 28, a shoulder 30, and a neck 32, which is common in a variety of glass bottles including beer bottles, wine bottles, and spirits bottles. The body 28 extends axially along the central longitudinal axis A from the closed base 12 to the shoulder 30. The shoulder 30 extends axially along the central longitudinal axis A from the body 28 to the neck 32 while also transitioning inwardly from the body 28 to the neck 32. The neck 32, in turn, extends axially along the central longitudinal axis A from the shoulder 30 and terminates at the mouth 16 of the container 10. In other embodiments of the glass container 10, the body 28 or the shoulder 30 may terminate at the mouth 16, meaning the neck 32, or both the shoulder 30 and the neck 32, are not present, which is common in a variety of glass jars.

The glass container 10 additionally includes a graphene-containing cold-end coating 34 (FIG. 3) disposed over the glass substrate 12 either alone or in combination with one or more other coatings. The cold-end coating 34 is disposed over at least a portion of the exterior surface 22 of the glass substrate 12 and may provide at least a portion of an outer surface 36 of the glass container 10. Here, as shown, the cold-end coating 34 is disposed directly onto the exterior surface 22 of the glass substrate 12, thus omitting a traditional hot-end coating, and does indeed provide at least a portion of the outer surface 36 of the glass container 10 since there are no other coatings applied over the cold-end coating 34. As used herein in reference to layered structures, "directly onto" means in direct contact with, while "over" means there may optionally be one or more intervening layers. The cold-end coating 34 is preferably the only coating applied over the glass substrate 12, excluding subsequently applied labels, barcodes, data matrix codes, and printed graphics, although in other embodiments the cold-end coating 34 may certainly be used in combination with at least one other coating.

The cold-end coating 34 is a smooth, lubricious, and scratch-resistant protective film that allows the glass container 10 to travel along conveyors and through manufacturing, inspection, packaging, filling, and other equipment, typically with many other containers, without being scuffed, surface damaged, or sticking to other containers and/or equipment. The cold-end coating 34 may be transparent so as not to obstruct the visibility of the contents being held within the internal containment space 14 of the glass container 10 and may also have a uniform composition throughout its thickness. In a non-limiting example, the cold-end coating 34 preferably has a thickness between 80 μm and 120 μm as measured from the exterior surface 22 of the glass substrate 12 to an exterior surface 38 of the coating 34, which is also the outer surface 36 of the glass container 10 if no other coatings are applied over the cold-end coating 34.

A coating thickness of 80-120 μm is preferred since it is thick enough to provide robust scuff resistance while not being too thick that the coating appears hazy. The cold-end coating 34 depicted in FIG. 3 is drawn illustratively and in idealized form; it is not necessarily drawn to scale in relation to the glass substrate 12.

The cold-end coating 34 includes graphene. The graphene present in the cold-end coating 34 may include single layer graphene (SLG), multilayer graphene (MLG), or both SLG and MLG. Single layer graphene is a two-dimensional atomic sheet of covalently bonded carbon atoms arranged as adjacent hexagonal carbon rings, each sharing at least one and as many as six carbons with another ring, in a honeycomb lattice structure, and multilayer graphene is a grouping of stacked layers of graphene in which the number of stacked layers, n, typically ranges from 2 to 20. The graphene may be functionalized graphene such as, for example, graphene oxide or graphene having a moiety or non-carbon atom covalently bonded with a carbon of the hexagonal carbon lattice. In some embodiments, the graphene is few layer graphene (FLG), which has from two to eight stacked layers of graphene (n=2 to 8) or more narrowly from two to five stacked layers of graphene (n=2 to 5), and is one example of MLG. The graphene may be provided as particles having particle sizes in the largest dimension that range from 5 μm to 200 μm or, more preferably, from 10 μm to 100 μm. The graphene particles include spherical particles and non-spherical particles including graphene flakes.

In addition to graphene, the cold-end coating 34 may include one or more organic materials such as, for example, one or more polymer compounds. Examples of suitable polymer compounds include various types of polyethylene, polyacrylate (acrylic), polyethylene oxide (POE), and copolymers thereof. Polyethylene and/or POE may be provided as a low molecular weight wax and, generally, the organic polymer components of the coating 34 may be capable of forming an aqueous emulsion prior to being formed into the coating 34. For purposes of this disclosure, polyethylene oxide and polyoxyethylene refer to the same polymer compound and are referred to with the abbreviation POE. One suitable copolymer that may be included in the cold-end coating 34 is an ethylene acrylic acid copolymer (EAA), which has properties that can be tailored based on the relative lengths of the polyethylene chains and the polyacrylate (acrylic acid) chains in the repeating unit. Of course, other synthetic or naturally occurring organic polymers, oligomers, fibers, etc. other than the specific polymers mentioned above may also be included in the cold-end coating 34. For example, materials capable of facilitating the encapsulation of graphene may be present as well as residual amounts of one or more preservatives contained in the composition used to form the cold-end coating 34.

The cold-end coating 34 may be free of inorganic, non-carbonaceous materials. The term "free" as used herein means that the particular material in question is not present within the cold-end coating 34 in more than a negligible amount and does not materially affect the properties of the coating 34. Indeed, the cold-end coating 34 is considered free of materials that may be residually present in the coating 34 as a commercially acceptable impurity. Specifically, the cold-end coating 34 may be free of metallic elements, metallic compounds or salts, minerals, silicon, silicon compounds such as silica ($SiO_2$), and/or silicon polymers or oligomers, all of which are examples of inorganic, non-carbonaceous materials. Furthermore, apart from graphene, the cold-end coating 34 may also be free of other inorganic, carbonaceous materials such as fullerenes, particulate carbon, and carbon nanostructures. The exclusion of inorganic, non-carbonaceous materials and/or inorganic, carbonaceous materials other than graphene is preferred but not necessarily mandatory in all embodiments.

Figure 4:
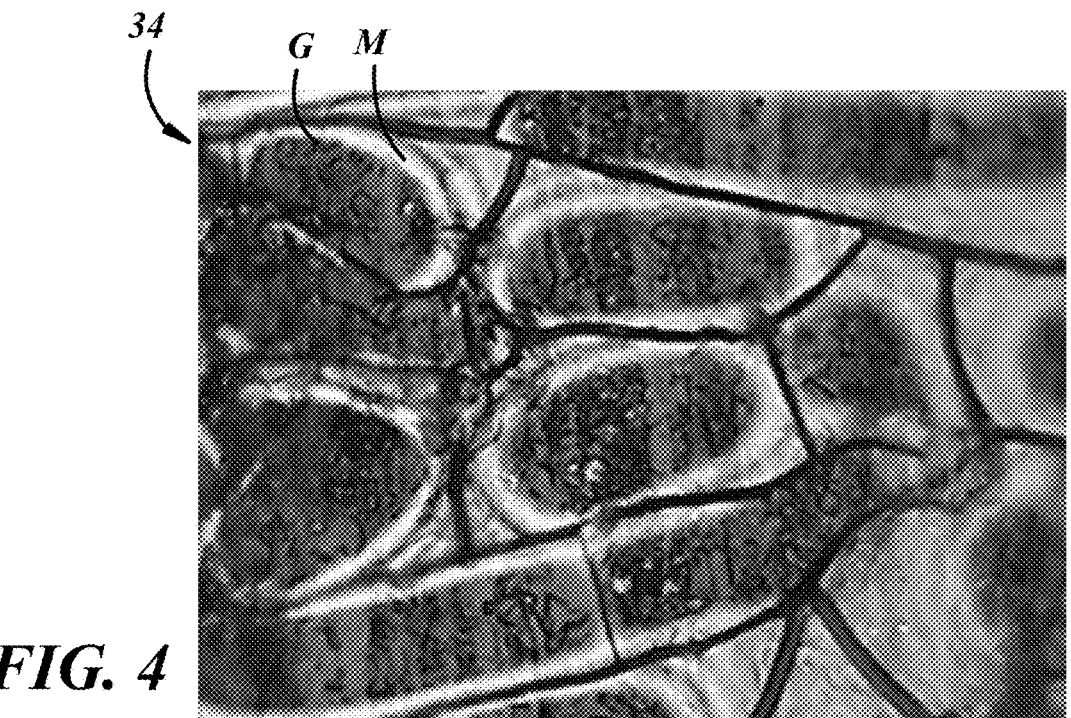
FIG. 4 is a photomicrograph of a cold-end coating that includes encapsulated graphene.

Referring now to FIG. 4, which is a photomicrograph taken at 500 times magnification (i.e., 500×), an implementation of the cold-end coating 34 is shown that includes encapsulated graphene in which graphene particles G are surrounded by and distributed within a polymer matrix material M of the one or more organic polymer compounds, as opposed to being concentrated in a separate layer outside of and above the polymer material. The graphene particles G may be encapsulated individually within the polymer matrix material M, encapsulated as a cluster of two or more graphene particles G within the polymer matrix material M, or a combination of both. Here, in FIG. 4, the graphene particles G are the dark areas, and the lighter areas surrounding the graphene particles G is the polymer matrix material M. The dark black lines shown in FIG. 4 are microcracks in the cold-end coating 34 and, in particular, in the polymer matrix material M. In this specific example, the polymer matrix material M is comprised of a mixture of EAA and POE, and the graphene particles G are comprised of MLG and, more specifically, FLG. In certain embodiments of the glass container 10, the cold-end coating 34 including encapsulated graphene may be disposed directly onto the glass substrate 12, meaning that no other coating, and certainly not a hot-end coating, is applied to the exterior surface 22 of the glass substrate 12 before the encapsulated graphene-containing cold-end coating 34 is applied.

Figure 5:
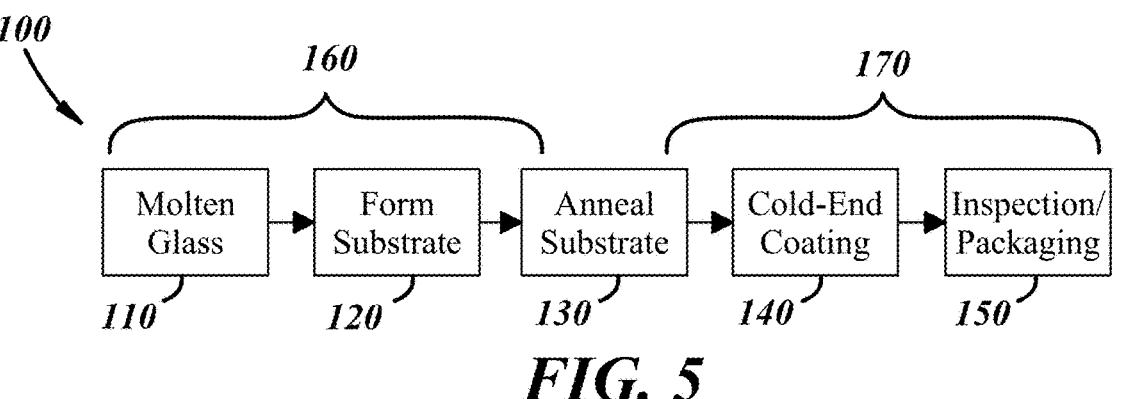
FIG. 5 is a process flow chart for producing a glass container that includes the disclosed cold-end coating.

An illustrative method for applying the cold-end coating 34 over, and preferably directly onto, the exterior surface 22 of the glass substrate 12 of the glass container 10 is depicted in the flow diagram of FIG. 5 as part of a larger method 100 of forming the glass container 10. The glass container forming method 100 includes, in sequence, supplying molten glass (step 110), forming the glass substrate 12 from the molten glass (step 120), annealing the glass substrate 12 (step 130), and applying the cold-end coating 34 over the glass substrate 12 (step 140) to form the glass container 10 prior to inspection and packaging of the glass container 10 (step 150). A hot end 160 of the method 100 includes all portions of the method 100 from the initial melting of a batch material up to the annealing step 130. A cold end 170 of the method 100 includes all portions of the method after the annealing step 130. A first portion of the annealing step 130 when the glass container 10 is at a temperature at or above 200° C. may also be considered part of the hot end 160, while a final portion of the annealing step 130 when the glass container 10 is at a temperature below 200° C. may be considered part of the cold end 170.

In the supplying glass step 110, molten glass is provided in any suitable way, although a preferred and well-known approach involves melting a vitrifiable batch material that includes a mixture of virgin raw materials and, optionally, recycled glass. The virgin raw materials may include quartz sand (a source of $SiO_2$), soda ash (a source of $Na_2O$), and limestone (a source of CaO), and any of a variety of other materials such as nepheline syenite, feldspar, dolomite, salt cake, carbon, colorants, decolorants, redox agents, and fining agents, among others. The vitrifiable batch material may also include glass intermediates or other precursors. However formulated, the vitrifiable batch material is melted in a continuous melting furnace or a melter, such as a submerged combustion melter, to produce molten glass. The molten glass is then fined or refined to remove gas bubbles from the glass and the resultant molten glass is conditioned in a forehearth, for example, to achieve thermally homogenized glass having a viscosity that enables subsequent glass-forming operations. At the end of the forehearth, the conditioned molten glass is discharged from a glass feeder. The conditioned molten glass is cut into a charge or gob of the conditioned molten glass and delivered to a glass container forming machine.

In the glass forming step 120, the molten glass supplied in the previous glass supply step 110, which is preferably in the form of a molten glass gob, is formed into the glass substrate 12 having the container shape. The glass container forming machine that receives the molten glass may include a blank mold and a blow mold. The molten glass is first received in the blank mold and, once received therein, is pressed or blown into a glass parison. A glass parison is a preform of the glass substrate 12 or, in other words, is a partial formation of the glass substrate 12. The glass parison is then transferred to the blow mold of the glass container forming machine. In the blow mold, the glass parison is blown into the glass substrate 12 by a compressed gas, which causes the glass to stretch and expand from the glass parison into the glass substrate 12 in conformance with the surrounding mold cavity of the blow mold. The formed glass substrate 12, which can now hold its own shape, may then be transferred to a conveyor or other transport device configured to transport the glass substrate 12 for further processing.

At this point, in a conventional glass container forming process, a hot-end coating comprised of a metal oxide would be applied to the exterior surface 22 of the newly formed glass substrate 12 by chemical vapor deposition. The hot-end coating would be applied prior to annealing while the glass substrate is still hot, for example, at a temperature between 400° C. to 800° C. In the illustrated method 100, however, a hot-end coating is not applied to the newly-formed glass substrate 12; rather, the glass substrate 12 is annealed in the annealing step 130 without a prior application of a hot-end coating. In that regard, after the glass substrate 12 is formed, the glass substrate 12 may be conveyed to an annealing lehr, which reheats the glass substrate 12 then gradually cools the substrate 12 to relieve internal residual strain within the substrate 12 and thus render the substrate 12 more fracture-proof and shatter-proof. During annealing, the glass substrate 12 is first heated to a temperature above the annealing point of the glass, which for soda-lime-silica glass usually lies within the range of 510° C. to 550° C., followed by slowly cooling the container at a rate of 1° C./min to 10° C./min to a temperature below the strain point of the glass, which for soda-lime-silica glass usually lies within the range of 470° C. to 500° C. To carry out the annealing process, for example, the front or entrance end of the annealing lehr may be maintained at a temperature between 500° C. and 700° C. while the back or exit end of the lehr may be maintained at a temperature between 80° C. and 130° C.

The cold-end coating 34 is applied over and, in the illustrated method 100, directly onto, the exterior surface 22 of the glass substrate 12 in the coating step 140. The cold-end coating 34 is applied over at least a portion of the exterior surface 22 and, preferably, over at least 80% or even at least 90% of the surface area of the exterior surface 22 of the glass substrate 12. A coating composition, which is described in more detail below, may be used to apply the cold-end coating 34. The coating composition may be sprayed onto the glass substrate 12 or it may be distributed by some other suitable application technique. In one approach, the coating composition is applied over the glass substrate 12, preferably by spraying, when the glass substrate 12 is at a temperature of 150° C. or less or, more preferably, a temperature between 120° C. and 145° C. or even between 130° C. and 140° C. Application of the cold-end coating 34 via the coating composition may be performed after the glass substrate 12 has been annealed and has exited the annealing lehr.

The coating composition may be a heterogeneous solution that comprises graphene, an aqueous emulsion of the one or more polymer compounds such as, for instance, one or more of polyethylene $(CH_2CH_2)_n$, polyethylene oxide $(CH_2CH_2O)_n$, and ethylene acrylic acid copolymer (EAA) $[(CH_2CH_2)_a(CH_2COOH)_b]_n$, and optionally a biocide. The graphene may be added to the solution, for example, as an aqueous suspension or directly as solids. Aqueous emulsions of the one or more polymer compounds are commercially available and may contain a surfactant, such as one or more copolymers having a non-polar or hydrophobic portion (e.g., $(CH_2CH_2)_a$) and a polar or hydrophilic portion (e.g., $(CH_2COOH)_b$), to help emulsify the polymer compound(s). The heterogeneous solution may include the biocide, if desired, and particularly when the glass container 10 will be used to store certain foods or beverages. The cold-end coating 34 may therefore be a food-grade coating certified by a government agency for use in food packaging. The biocide may include an alcohol, a preservative, or a combination thereof. In one example, the biocide includes isopropyl alcohol and/or a linear ethoxylated alcohol that evaporates after the coating composition is applied to the glass substrate 12. Some preservatives that may be included in the biocide include butylated hydroxytoluene (BHT) and/or methylisothiazolinone (MIT). The preservatives may be incorporated into the aqueous polymer emulsion(s).

more concentrated form as the cold-end coating 34 with encapsulated graphene. The continuous liquid phase evaporates out of solution as the coating composition is being transferred towards the glass substrate 12, as in the case of spraying, and/or after the coating composition is applied to the glass substrate 12, especially if the glass substrate 12 is heated when the composition is applied, as discussed above, to deposit the cold-end coating 34. In many instances, all of the continuous liquid phase evaporates out of the solution, which leaves behind less than 2 wt % of the continuous liquid phase in the cold-end coating 34 and typically only entrained residuals of the liquid phase. As the continuous liquid phase evaporates out of the solution, the one or more emulsified organic polymer compounds conglomerate around the distributed graphene particles—this process is fostered by the graphene particles being suspended in the heterogeneous solution—to establish the polymer matrix material M and the distribution of encapsulated graphene particles G within the polymer matrix material M.

In one specific example, the heterogeneous solution used to form the cold-end coating 34 includes diluent water, isopropyl alcohol, an aqueous emulsion of EAA and POE, and suspended graphene particles. The water (including the water from the aqueous emulsion) and alcohol thus comprise the continuous liquid phase while the emulsified EAA, the emulsified POE, and the suspended graphene comprised the dispersed phase. The weight percent of each of the above-mentioned components in the heterogeneous solution may be provided as set forth below in Table 1, which also shows the weight percent of each component in the applied cold-end coating 34 after evaporation of the liquid phase. The weight percent ranges shown in parenthesis are narrower, more preferred ranges.

TABLE 1

| Weight Percent Ranges of Components in Solution and Coating | | |
| --- | --- | --- |
| Component | Wt % in Solution | Wt % in Coating |
| EAA | 0.8-3 (1-2) | 65-85 (70-80) |
| POE | 0.15-0.8 (0.2-0.6) | 10-35 (20-30) |
| Alcohol | 0.8-3 (1-2) | <2 |
| Graphene | 0.00002-0.00008 (0.00004-0.00006) | 0.001-0.004 (0.002-0.003) |
| Water | Balance | <2 |

The heterogeneous solution includes a continuous liquid phase and a dispersed phase within the continuous liquid phase when the solution components are mixed together. The continuous liquid phase includes water—some of which may be provided by the aqueous emulsion and the aqueous graphene suspension if such a vehicle is used to add graphene to the solution, and the rest of which may be provided as a diluent—and the biocide if present. The dispersed phase includes the one or more emulsified organic polymer compounds, which are dispersed in the liquid phase, and the graphene, which is suspended in the liquid phase. The graphene may be functionalized with a polar or hydrophilic moiety or otherwise modified to help maintain its suspension in the liquid phase and delay settling. The graphene, for example, may be functionalized MLG and, in particular, functionalized FLG. Additionally or alternatively, the solution may be continuously agitated in the equipment used to apply the coating composition to the glass substrate 12 and/or may be agitated into a state of turbulence just before the coating composition exits the coating equipment.

At least a portion of the continuous liquid phase evaporates out of the solution to deposit the dispersed phase in a The example heterogeneous solution may be prepared by mixing into water, which is preferably deionized water, the following ingredients in amounts that achieve the weight percent ranges set forth above in Table 1: (i) an aqueous emulsion of EAA and (ii) an aqueous emulsion of POE—the two emulsions blending together to provide an aqueous emulsion containing both the EAA and POE polymer compounds—(iii) isopropyl alcohol, and (iv) an aqueous suspension of graphene. In one specific example, 58.6 grams of a 25% solids content aqueous EAA emulsion, 20.2 grams of a 23% solids content aqueous POE emulsion, 16 grams of 100% isopropyl alcohol, and 0.5 grams of a 0.1 wt % aqueous graphene solution (i.e., a solution containing 1 gram graphene in 1 liter of water), and one liter of deionized water were mixed together and agitated to form the heterogeneous solution in a ready-to-apply formulation. Each of the aqueous emulsion of EAA and the aqueous emulsion of POE had a basic pH ranging from 9 to 10 and the graphene suspension had a more neutral pH ranging from 6.5 to 8.5. The heterogeneous solution had a basic pH ranging from 7.5 to 9.5 and, more preferably, from 8 to 9.

Example

A coating composition in the form of a heterogeneous solution was prepared with the ingredients listed below in Table 2, which also details the amount of each ingredient used to make the solution and the quantity of the dispersed phase that each ingredient contributed. Each of the EAA and POE aqueous emulsions also contained a small amount of preservative as a biocide. After being prepared, the heterogeneous solution was applied directly onto the exterior surface of a container shaped glass substrate to deposit a cold-end coating. The heterogeneous solution was applied directly onto the glass substrate using a spray gun having a 0.7-millimeter orifice and pressurized to 1.5-2.0 bars. The glass substrate was heated prior to application of the heterogeneous solution and, during application of the solution, had a temperature of 140° C. The cold-end coating was the only coating applied to the glass substrate; that is, no other coatings were applied to the glass substrate prior to application of the cold-end coating and no other coatings were applied on top of the cold-end coating. Additionally, for comparison purposes, and using the same application process, a container shaped glass substrate was sprayed with a solution that contained only emulsified EAA and another container shaped glass substrate was sprayed with a solution that contained only emulsified EAA and emulsified POE.

TABLE 2

Ingredients Used to Make the Heterogeneous Solution

| Amount | Ingredient | Dispersed Phase Content |
|---|---|---|
| 58.6 g | 25% (solids) EAA Aqueous Emulsion | 14.7 g EAA |
| 20.15 g | 23% (solids) POE Aqueous Emulsion | 4.6 g POE |
| 16 g | 100% Isopropyl Alcohol | — |
| 0.5 g | 0.1% (1 g/L) FLG Aqueous Suspension | 0.5 mg FLG |
| 1 L | Deionized Water | — |

Figures 6, 7:
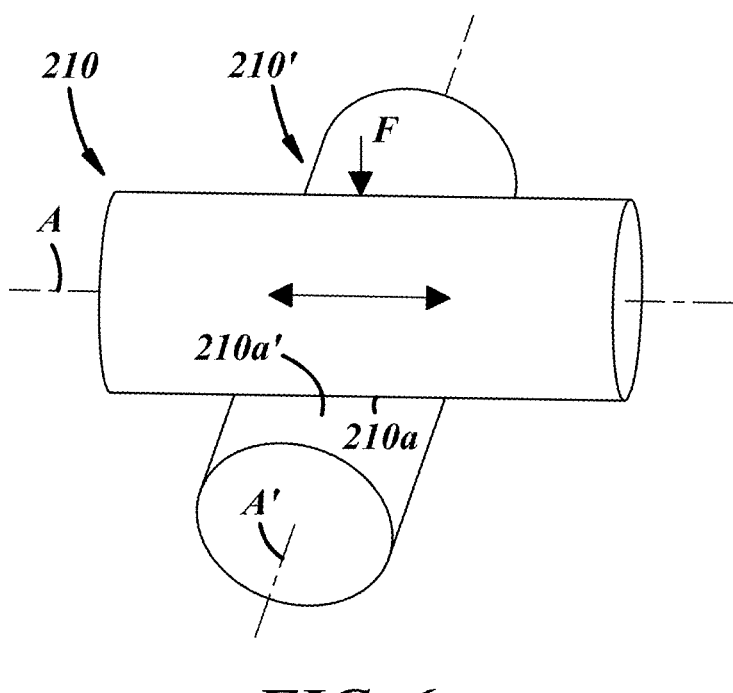
FIG. 6 is a schematic representation of a scuff resistance test for a glass container.
FIG. 7 is a chart illustrating the scuff resistance of glass containers with different cold-end coatings.

After the cold-end coatings were applied, the coated glass containers were cooled to room temperature and the coatings were subjected to scuff resistance testing. As represented schematically in FIG. 6, the scuff resistance test positioned two coated glass containers 210, 210' with their respective axes A, A' arranged perpendicular to each other in parallel planes while corresponding cylindrical portions 210a, 210a' of the containers 210, 210' were in point contact with each other. A 50N mutually radial load F was applied to the containers 210, 210' and one of the containers 210 was oscillated at a constant frequency under load in the direction of its axis A with a peak-to-peak amplitude of 1 cm. The scuff resistance of a coating (in seconds) was determined by measuring the time until coating failure at six separate locations along the perimeter of the container and then calculating the average of the six failure times. Coating failure was indicated by a characteristic change in sound when glass-on-glass contact occurred. Scuff resistance testing was performed under both wet and dry conditions. The results of the scuff resistance tests are illustrated in FIG. 7 for the cold-end coating according to the present disclosure (EAA+POE+Graphene) as well as the comparative cold-end coatings (EAA, EAA+POE).

During scuff resistance testing, the initial behavior of the various cold-end coatings is believed to be similar in that the coating breaks down and transforms into small particles that roll between the opposing glass surfaces and temporarily prevent glass-on-glass contact. The scuff resistance mechanism during this initial time period is thus mechanical and dynamic. The comparative EAA cold-end coating produced small particles that stayed in place between the test containers during testing, while the comparative EAA+POE cold-end coating produced small particles that were quickly ejected from between the test containers during testing. As shown in FIG. 7, wet test conditions amplified this phenomenon—that is, the scuff resistance is similar for the comparative EAA and EAA+POE cold-end coatings under dry conditions, but the comparative EAA cold-end coating performed better than the comparative EAA+POE cold-end coating under wet conditions. For both of the comparative cold-end coatings, wet scuff resistance was significantly lower than dry scuff resistance.

The cold-end coating according to the present disclosure, which included EAA, POE, and graphene, outperformed the comparative cold-end coatings under both the wet and dry conditions, and especially under wet conditions. The improvement is believed to be the result of the synergistic effect of EAA, POE, and the graphene within the same cold-end coating as well as the encapsulation of graphene particles within a polymer matrix material of the coating as discussed above in connection with FIG. 4. Without being bound by theory, it is believed that the EAA provides sealing and barrier protection to the exterior surface of the glass substrate and protects against glass migration out of the substrate, and that the POE adds some lubricity to the coating to help postpone the deterioration of the coating. It is also believed that the encapsulated graphene improves scuff resistance by exposing graphene, which behaves as a localized lubricant, to the surface of the coating when the coating is damaged. The exposed graphene is also hydrophobic and, as such, helps repel water and, in particular, humidity, from the damaged part of the coating. This ability to reject water helps keep water from penetrating into the coating and breaking down the adhesion between the coating and the underlying glass substrate. Moreover, encapsulating the graphene within the cold-end coating still allows for labels to be placed over the coating since encapsulated graphene does not substantially affect the surface tension of the coating in the same way that a concentrated layer of external graphene would.

The subject matter of this application is presently disclosed in conjunction with several illustrative embodiments and modifications to those embodiments. All terms used herein are intended to be merely descriptive, rather than necessarily limiting, and are to be interpreted and construed in accordance with their ordinary and customary meaning in the art, unless used in a context that requires a different interpretation. As such, many other embodiments, modifications, and equivalents thereto will readily be suggested to persons of ordinary skill in the art in view of the present disclosure and all such variations, even though not necessarily explicitly disclosed, that fall within the scope of the accompanying claims are intended to be embraced by the present disclosure.

The invention claimed is:

1. A glass container, comprising:
a glass substrate having a container shape; and
a cold-end coating applied over an exterior surface of the glass substrate, the cold-end coating comprising encapsulated graphene in which graphene particles are surrounded by and distributed within a polymer matrix material.

2. The glass container set forth in claim 1, wherein the cold-end coating is applied directly onto the exterior surface of the glass substrate.

3. The glass container set forth in claim 1, wherein the polymer matrix material includes at least one of polyethylene, polyacrylate, polyethylene oxide, or a copolymer thereof.

4. The glass container set forth in claim 3, wherein the polymer matrix material includes ethylene acrylic acid copolymer, polyethylene oxide, or both ethylene acrylic acid copolymer and polyethylene oxide.

5. The glass container set forth in claim 1, wherein the cold-end coating is free of inorganic, non-carbonaceous materials.

6. The glass container set forth in claim 1, wherein the graphene is multilayer graphene.

7. The glass container set forth in claim 1, wherein the graphene is few layer graphene.

8. The glass container set forth in claim 1, wherein the cold-end coating comprises from 65 wt % to 85 wt % of ethylene acrylic acid copolymer, from 10 wt % to 35 wt % of polyethylene oxide, and from 0.001 wt % to 0.004 wt % of the graphene particles.

9. A glass container, comprising:

a glass substrate having a container shape and including an exterior surface; and a cold-end coating applied directly onto the exterior surface of the glass substrate and further defining at least a portion of an outer surface of the glass container, the cold-end coating comprising particles of multilayer graphene encapsulated within an organic polymer matrix material, and wherein the cold-end coating is free of inorganic, non-carbonaceous materials.

10. The glass container set forth in claim 9, wherein the multilayer graphene is few layer graphene.

11. The glass container set forth in claim 9, wherein the organic polymer matrix material includes ethylene acrylic acid copolymer, polyethylene oxide, or both ethylene acrylic acid copolymer and polyethylene oxide.

12. The glass container set forth in claim 9, wherein the cold-end coating comprises from 65 wt % to 85 wt % of ethylene acrylic acid copolymer, from 10 wt % to 35 wt % of polyethylene oxide, and from 0.001 wt % to 0.004 wt % of the multilayer graphene particles.

13. The glass container set forth in claim 9, wherein the glass substrate includes a closed base and a circumferential wall, the circumferential wall extending axially along a central longitudinal axis of the glass container from a periphery of the closed base to a mouth while also circumscribing the central longitudinal axis.

*  *  *  *  *